Aug. 3, 1937.      J. EVERHARDS      2,088,735
FOREHEAD LAMP FOR DOCTORS
Filed April 25, 1936

INVENTOR.
Joseph Everhards.
By Chatwin & Company. Attys.

Patented Aug. 3, 1937

2,088,735

UNITED STATES PATENT OFFICE 2,088,735

FOREHEAD LAMP FOR DOCTORS

Joseph Everhards, Cologne, Germany

Application April 25, 1936, Serial No. 76,398
In Germany July 31, 1935

1 Claim. (Cl. 128—22)

For the illumination of hollow parts of the body when operating on or examining a patient, doctors usually make use of the so-called forehead-lamp, that is an illuminating device mounted on a band adapted to fit on the forehead which device by optical means throws a circular light on to the patient. Lamps of this kind, hitherto known have more or less great drawbacks which have not been eliminated up to the present. The device, for instance, protrudes too much and thus hinders the doctor and his assistant in performing the operation or examination. Generally, the device weighs too heavily so that the head is subjected to an unpleasant pressure. The surface illuminated by known devices is neither sufficiently clear nor uniform. Frequently an image of the filament of the lamp is projected onto the surface illuminated which renders the diagnosis more difficult. The lamp of known devices is usually mounted right in front so that the patient becomes dazzled and doctor as well as patient are troubled by the heat radiated. Moreover, most of the known forehead lamps are comparatively complicated and somewhat expensive.

The subject matter of the present invention is a new type of forehead lamp which eliminates all the disadvantages above mentioned. In accordance with the invention this is attained by the following device. A turnable tube, the interior of which is provided with a lamp and a condenser lens, is provided at the other end with an inclined and slightly downwardly tilted plane mirror. Said mirror reflects the light dispersed by the lens through a cut-out portion provided in the tube backwardly onto a concave mirror arranged behind said tube and connected rigidly thereto, said concave mirror reflecting the rays in a pure uniform and light cone forwardly past the tube.

Figure 1:
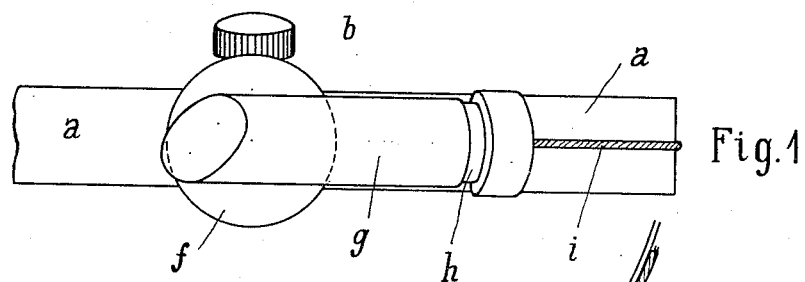
Figure 2:
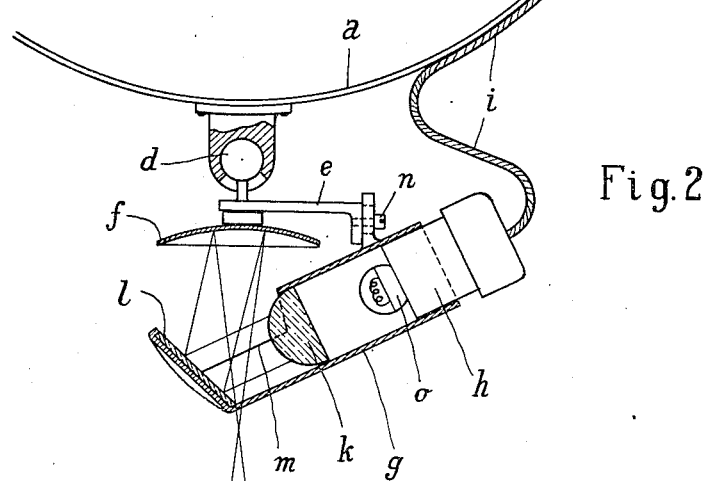
Figure 3:
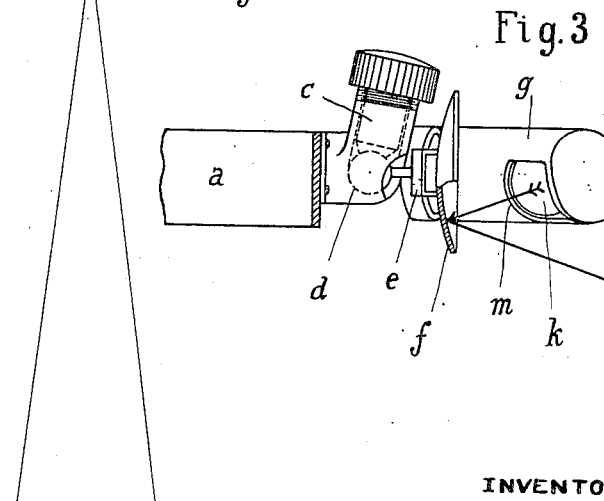

Figs. 1 to 3 of the drawing show a constructional form of the present invention by way of example.

Figure 1 represents a front elevation; Fig. 2 a plan view partly in longitudinal section; and Fig. 3 a side elevation.

At the front of the forehead band $a$ located in a casing $c$ mounted thereon and provided with a screwhead $b$, a ball-joint $d$ is provided which ball-joint $d$ carries the arm $e$ having the concave mirror $f$ rigidly connected thereto (Fig. 3). The angular end of the arm $e$ further carries the tube $g$ inclined at a certain angle to the concave mirror.

The casing $h$, adjustable in longitudinal direction having the small lamp $o$, is inserted from the right in said tube $g$ the lamp $o$ being connected to a wire $i$ leading round the forehead band (Fig. 2). At a suitable distance from the lamp, a condenser lens $k$ is arranged in the tube which lens disperses and throws the light coming from the lamp onto the plane mirror $l$ arranged at an inclined position at the left end of the tube. This mirror, in addition, is slightly tilted downwardly so that it reflects the rays backwards through slot $m$ provided in the tube $g$ onto a part of the concave mirror $f$ located correspondingly lower, as illustrated in Fig. 3. The concave mirror finally reflects the light forward past the tube and produces at a distance of about 20–30 cm. a light, clean and absolutely uniform illuminated surface, the size of which corresponds to about that of a palm. This illuminated patch could not be adapted better to the requirements of a doctor when making operations or medical examinations.

Through the ball joint $d$ the illuminating device mounted thereon as a whole can be brought into any position desired and the light can so be directed anywhere by a single manipulation. All parts of the device remain constantly in their proper position as they are rigidly connected to each other. By screwing down the screw-head $b$ the device can be fixed in any suitable position. As can be seen from Fig. 2, the distance of the tube $g$ and thereby that of the plane mirror $l$ from the concave mirror $f$ can be adjusted by means of the screw $n$ whereby the surface illuminated can be increased or diminished.

The new forehead lamp has all advantages which such a device should have. It is cheap, simple, light and of compact construction. It does not obstruct when operating, it has no dazzling effect and does not become hot and, moreover, produces a light, pure and uniformly illuminated surface.

If required, air holes can be provided in the wall of the tube, preferably on the back, for cooling the lamp when used for a longer space of time.

If constructed on a larger scale the new illuminating device can be employed for other purposes as for instance for advertising by means of illuminating effects. Thus, by means of this device an advertising surface can be illuminated in a uniform manner without attracting the attention of an observer, as for instance a transparent advertising surface in a shop window and so on. If, for instance a diapositive is placed in the path of the rays at a suitable place, per example in the cut-out portion $m$ of the tube, the device can be used for the projection of daguerreotypes or photographs.

I claim:—

A forehead lamp for doctors comprising, in combination, a headband, a tubular member mounted inclined to said headband, an arm carrying said tubular member, a bracket carried by the headband, means mounting said arm on said bracket, a concave reflector carried by said arm, a hollow plug fitting in one end of said tubular member, a lamp mounted in said plug, a condenser lens in the tubular member, a plane reflector carried by the other end of said tubular member, said reflector being inclined, means for supplying current to the lamp, and a slot in the tubular member for the passage of light to the concave reflector.

JOSEPH EVERHARDS.